(12) United States Patent
Chatterjee et al.

(10) Patent No.: US 11,050,944 B2
(45) Date of Patent: Jun. 29, 2021

(54) SWITCHED POLARIZATION IMAGING TO DETECT DISPLAY SCREEN

(71) Applicant: Microsoft Technology Licensing, LLC, Redmond, WA (US)

(72) Inventors: Ishan Chatterjee, Mountain View, CA (US); Christian Holz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 16/204,779

(22) Filed: Nov. 29, 2018

(65) Prior Publication Data
US 2020/0177784 A1 Jun. 4, 2020

(51) Int. Cl.
*H04N 5/235* (2006.01)
*G02F 1/1343* (2006.01)
(Continued)

(52) U.S. Cl.
CPC ......... *H04N 5/2352* (2013.01); *G02F 1/1396* (2013.01); *G02F 1/13439* (2013.01);
(Continued)

(58) Field of Classification Search
CPC ............. H04N 5/2352; H04N 1/00129; H04N 5/23245; H04N 2201/0084; G02F 1/13439; G02F 1/1396; G02F 2203/48
See application file for complete search history.

(56) References Cited

U.S. PATENT DOCUMENTS

| 7,872,666 B2 | 1/2011 | Van Schaik et al. |
| 8,682,030 B2 | 3/2014 | Large |

(Continued)

FOREIGN PATENT DOCUMENTS

| CN | 201845160 U | 5/2011 |
| CN | 108566504 | * 9/2018 |

(Continued)

OTHER PUBLICATIONS

Ballendat, et al., "Proxemic Interaction: Designing for a Proximity and Orientation-Aware Environment", In Proceedings of the ACM International Conference on Interactive Tabletops and Surfaces, Nov. 7, 2010, 10 Pages.

Brudy, et al., "CurationSpace: Cross-Device Content Curation Using Instrumental Interaction", In Proceedings of the ACM on Interactive Surfaces and Spaces Nov. 6-9, 2016, 10 Pages.

(Continued)

*Primary Examiner* — Luong T Nguyen
(74) *Attorney, Agent, or Firm* — Alleman Hall Creasman & Tuttle LLP

(57) ABSTRACT

An imaging system comprises an optical sensor array with a plurality of sensor elements, an objective lens, an active polarization filter, and associated logic. The objective lens is configured to direct light from a field of view onto the plurality of sensor elements. Switchable electronically between first and second operational states, the active polarization filter is positioned to filter the light en route to the optical sensor array. The active polarization filter provides unequal relative attenuance, in the first versus the second operational state, of nonparallel polarization components of the light. The logic is configured to switch the active polarization filter from the first operational state to the second operational state, and to compare a light-intensity response of the plurality of sensor elements in the first operational state to the light-intensity response of the plurality of sensor elements in the second operational state.

15 Claims, 8 Drawing Sheets

(51) Int. Cl.
    G02F 1/139      (2006.01)
    H04N 1/00       (2006.01)
    H04N 5/232      (2006.01)
(52) U.S. Cl.
    CPC ..... H04N 1/00129 (2013.01); H04N 5/23245 (2013.01); *G02F 2203/48* (2013.01); *H04N 2201/0084* (2013.01)

(56) References Cited

U.S. PATENT DOCUMENTS

| | | | |
|---|---|---|---|
| 9,369,620 | B2 | 6/2016 | Shi et al. |
| 9,445,154 | B2 | 9/2016 | Baker |
| 9,448,456 | B2 | 9/2016 | Asatryan et al. |
| 10,012,884 | B2 | 7/2018 | Osterman et al. |
| 10,061,138 | B2 | 8/2018 | Mead et al. |
| 2004/0189196 | A1 | 9/2004 | Cok |
| 2004/0257565 | A1* | 12/2004 | Ishihara ............... G01J 4/04 356/364 |
| 2005/0259179 | A1 | 11/2005 | Robertson et al. |
| 2008/0252769 | A1 | 10/2008 | Verstegen et al. |
| 2011/0149125 | A1 | 6/2011 | Morimoto |
| 2012/0262452 | A1* | 10/2012 | Tadao ................. H04N 13/341 345/419 |
| 2012/0268602 | A1 | 10/2012 | Hirai et al. |
| 2013/0136306 | A1 | 5/2013 | Li et al. |
| 2015/0029389 | A1 | 1/2015 | Masanori |
| 2015/0286289 | A1 | 10/2015 | Lee |
| 2015/0317768 | A1* | 11/2015 | Chen ..................... G06F 3/017 345/655 |
| 2015/0381871 | A1 | 12/2015 | Makino |
| 2016/0231582 | A1 | 8/2016 | Yamaguchi |
| 2016/0282639 | A1* | 9/2016 | von und zu Liechtenstein ........... G02C 7/101 |
| 2018/0336655 | A1 | 11/2018 | Yamazaki et al. |
| 2020/0177776 | A1 | 6/2020 | Chatterjee et al. |

FOREIGN PATENT DOCUMENTS

| | | |
|---|---|---|
| CN | 108566504 A | 9/2018 |
| EP | 1067780 A2 | 1/2001 |
| EP | 2491340 A1 | 8/2012 |
| JP | 2012-080285 * | 4/2012 |
| JP | 2012080285 A | 4/2012 |
| KR | 100708938 B1 | 4/2007 |
| WO | 2016084359 A1 | 6/2016 |

OTHER PUBLICATIONS

Chen, et al., "Graduate Student Use of a Multi-Slate Reading System", In Proceedings of the SIGCHI Conference on Human Factors in Computing Systems, Apr. 27-May 2, 2013, 10 Pages.

Greenberg, et al., "Proxemic Interactions: The New Ubicomp?", In Journal of Magazine Interactions, vol. 18, Issue 1, Jan. 2011, 11 Pages.

Grubert, et al., "HeadPhones: Ad Hoc Mobile Multi-Display Environments Through Head Tracking", In Proceedings of the CHI Conference on Human Factors in Computing Systems, May 6-11, 2017, 6 Pages.

Hamilton, et al., "Conductor: Enabling and Understanding Cross-Device Interaction", In Proceedings of the 32nd Annual ACM Conference on Human Factors in Computing Systems, Apr. 26-May 1, 2014, pp. 2773-2782.

Hinckley, et al., "Stitching: Pen Gestures that Span Multiple Displays", In Proceedings of the Working Conference on Advanced Visual Interfaces, May 25, 2004, pp. 23-31.

Huang, et al., "MagMobile: Enhancing Social Interactions with Rapid View-Stitching Games of Mobile Devices", In Proceedings of the 11th International Conference on Mobile and Ubiquitous Multimedia, Dec. 4, 2012, 4 Pages.

Jin, et al., "Tracko: Ad-hoc Mobile 3D Tracking Using Bluetooth Low Energy and Inaudible Signals for Cross-Device Interaction", In Proceedings of the 28th Annual ACM Symposium on User Interface Software, Nov. 11, 2015, pp. 147-156.

Karnik, et al., "PIVOT: Personalized View-overlays for Tabletops", In Proceedings of the 25th Annual ACM Symposium on User Interface Software and Technology, Oct. 7-10, 2012, pp. 271-280.

Karnik, et al., "MUSTARD: A Multi User See Through AR Display", In Proceedings of the SIGCHI Conference on Human Factors in Computing Systems, May 5-10, 2012, pp. 2541-2550.

Kister, et al., "GraSp: Combining Spatially-aware Mobile Devices and a Display Wall for Graph Visualization and Interaction", In Journal of Computer Graphics Forum, vol. 36, Issue 3, Jun. 2017, pp. 503-514.

Koike, et al., "Transparent 2-D Markers on an LCD Tabletop System", In Proceedings of the SIGCHI Conference on Human Factors in Computing Systems, Apr. 4-9, 2009, pp. 163-172.

Kuechler, et al., "Collaboard: A Remote Collaboration Groupware Device Featuring an Embodiment-enriched Shared Workspace", In Proceedings of the 16th ACM International Conference on Supporting Group Work, Nov. 7-10, 2010, pp. 211-214.

Li, et al., "Dynamic Tiling Display: Building an Interactive Display Surface using Multiple Mobile Devices", In Proceedings of the 11th International Conference on Mobile and Ubiquitous Multimedia, Dec. 4-6, 2012, 4 Pages.

Lindlbauer, et al., "Tracs: Transparency-control for See-through Displays", In Proceedings of the 27th Annual ACM Symposium on User Interface Software and Technology, 4, Oct. 5, 2014, pp. 657-661.

Lissermann, et al., "Permulin: Mixed-Focus Collaboration on Multi-View Tabletops", In Proceedings of the 32nd Annual ACM Conference on Human Factors in Computing Systems, Apr. 26, 2014, pp. 3191-3200.

Lucero, et al., "Pass-them-around: collaborative use of mobile phones for photo sharing", In Proceedings of the SIGCHI Conference on Human Factors in Computing Systems, May 7, 2011, 12 Pages.

Lucero, et al., "Collaborative Use of Mobile Phones for Brainstorming", In Proceedings of the 12th International Conference on Human Computer Interaction with Mobile Devices and Service, Sep. 7, 2010, pp. 337-340.

Marquardt, et al., "Cross-Device Interaction via Micro-mobility and F-formations", In Proceedings of the 25th Annual ACM Symposium on User Interface Software and Technology, Oct. 7, 2012, 10 Pages.

Marquardt, et al., "The Proximity Toolkit: Prototyping Proxemic Interactions in Ubiquitous Computing Ecologies", In Proceedings of the 24th Annual ACM Symposium on User Interface Software and Technology, Oct. 16, 2011, pp. 315-325.

Plank, et al., "Is Two Enough?: I Studying Benefits, Barriers, and Biases of Multi-Tablet Use for Collaborative Visualization", In Proceedings of the CHI Conference on Human Factors in Computing Systems, May 6-11, 2017, pp. 4548-4560.

Radle, et al. "PolarTrack: Optical Outside-In Device Tracking that Exploits Display Polarization", In Proceedings of the CHI Conference on Human Factors in Computing Systems, Apr. 21, 2018, 9 Pages.

Radle, et al., "HuddleLamp: Spatially-Aware Mobile Displays for Ad-hoc Around-the-Table Collaboration", In Proceedings of the Ninth ACM International Conference on Interactive Tabletops and Surfaces, Nov. 16, 2014, pp. 45-54.

Radle, et al., "Spatially-aware or Spatially-agnostic?: Elicitation and Evaluation of User-Defined Cross-Device Interactions", In Proceedings of the 33rd Annual ACM Conference on Human Factors in Computing Systems, Apr. 18, 2015, pp. 3913-3922.

Schreiner, et al., "Connichiwa: A Framework for Cross-Device Web Applications", In Proceedings of the 33rd Annual ACM Conference Extended Abstracts on Human Factors in Computing Systems, Apr. 18, 2015, pp. 2163-2168.

Shoemaker, et al., "Single Display Privacyware: Augmenting Public Displays with Private Information", In Proceedings of the SIGCHI Conference on Human Factors in Computing Systems, vol. 3, Issue 1, Mar. 1, 2001, pp. 522-529.

Tang, John C., "VideoDraw: A Video Interface for Collaborative Drawing", In Proceedings of the SIGCHI Conference on Human Factors in Computing Systems, Apr. 1990, pp. 313-320.

(56) References Cited

OTHER PUBLICATIONS

Wilson, et al., "CrossMotion: Fusing Device and Image Motion for User Identification, Tracking and Device Association", In Proceedings of the 16th International Conference on Multimodal Interaction, Nov. 12, 2014, pp. 216-223.

Wozniak, et al., "RAMPARTS: Supporting Sensemaking with Spatially-Aware Mobile Interactions", In Proceedings of the CHI Conference on Human Factors in Computing Systems, May 7, 2016, pp. 2447-2460.

Wu, et al., "EagleSense: Tracking People and Devices in Interactive Spaces using Real-Time Top-View Depth-Sensing", In Proceedings of the CHI Conference on Human Factors in Computing Systems, May 6, 2017, pp. 3929-3942.

Zagermann, et al., "When Tablets meet Tabletops: The Effect of Tabletop Size on Around-the-Table Collaboration with Personal Tablets", In Proceedings of the CHI Conference on Human Factors in Computing Systems, May 7, 2016, pp. 5470-5481.

Summet, et al., "Tracking Locations of Moving Hand-held Displays Using Projected Light", In Proceedings of International Conference on Pervasive Computing, 9 Pages.

Iqbal, Mohammad, "Polarization Stereoscopic Imaging Prototype", In Doctoral Dissertation of University of Burgundy, Nov. 2, 2011, 189 Pages.

Non Final Office Action Issued in U.S. Appl. No. 16/204,613, dated May 29, 2020, 16 Pages.

International Search Report and Written Opinion Issued in PCT Application No. PCT/US19/062079, dated Jun. 15, 2020, 18 Pages.

Ding, et al., "Eavesdropping of Display Devices by Measurement of Polarized Reflected Light", In Journal of Applied Optics, vol. 57, Issue 19, Jul. 1, 2018, pp. 5483-5491.

International Search Report and Written Opinion Issued in PCT Application No. PCT/US19/062709, dated Jun. 19, 2020, 18 Pages.

\* cited by examiner

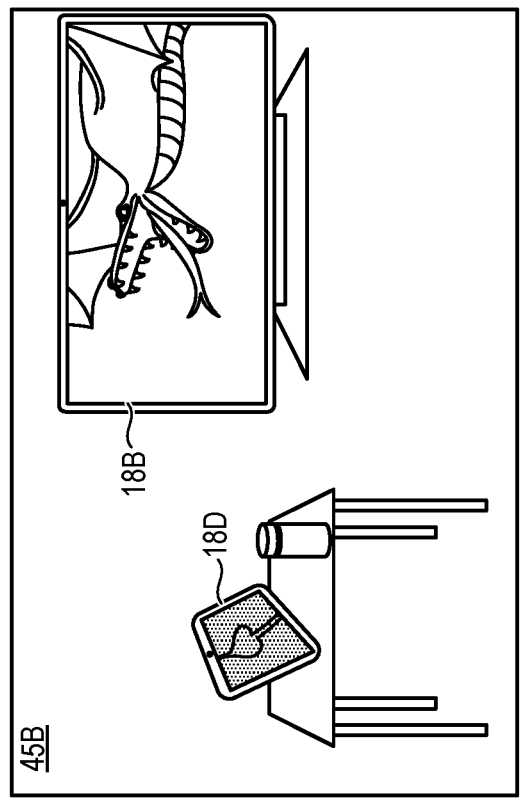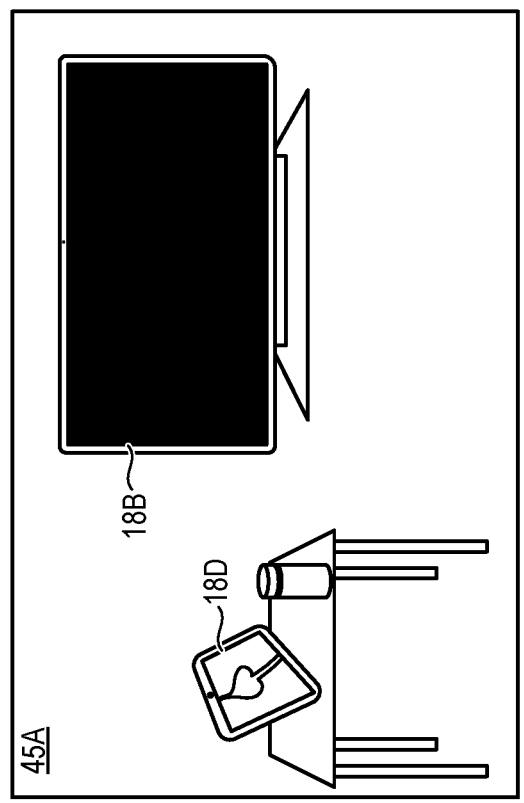
FIG. 5

SWITCHED POLARIZATION IMAGING TO DETECT DISPLAY SCREEN

BACKGROUND

In recent years, electronic devices made for the consumer market have become increasingly functional due to improvements in processing speed, data-storage capacity, display fidelity, imaging resolution, and network connectivity, for example. Leveraging these improvements, various usage scenarios have emerged in which different electronic devices are operated coordinately for still greater functionality. Coordinated operation of electronic devices typically requires some form of network-mediated discovery, which enables the various devices to recognize each other and share data.

SUMMARY

One aspect of this disclosure is directed to an imaging system comprising an optical sensor array with a plurality of sensor elements, an objective lens, an active polarization filter, and associated logic. The objective lens is configured to direct light from a field of view onto the plurality of sensor elements. Switchable electronically between first and second operational states, the active polarization filter is positioned to filter the light en route to the optical sensor array. The active polarization filter provides unequal relative attenuance, in the first versus the second operational state, of nonparallel polarization components of the light. The logic is configured to switch the active polarization filter from the first operational state to the second operational state, and to compare a light-intensity response of the plurality of sensor elements in the first operational state to the light-intensity response of the plurality of sensor elements in the second operational state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 illustrates example first and second digital images acquired with different polarization filtering by an imaging system.

DETAILED DESCRIPTION

Figure 1:
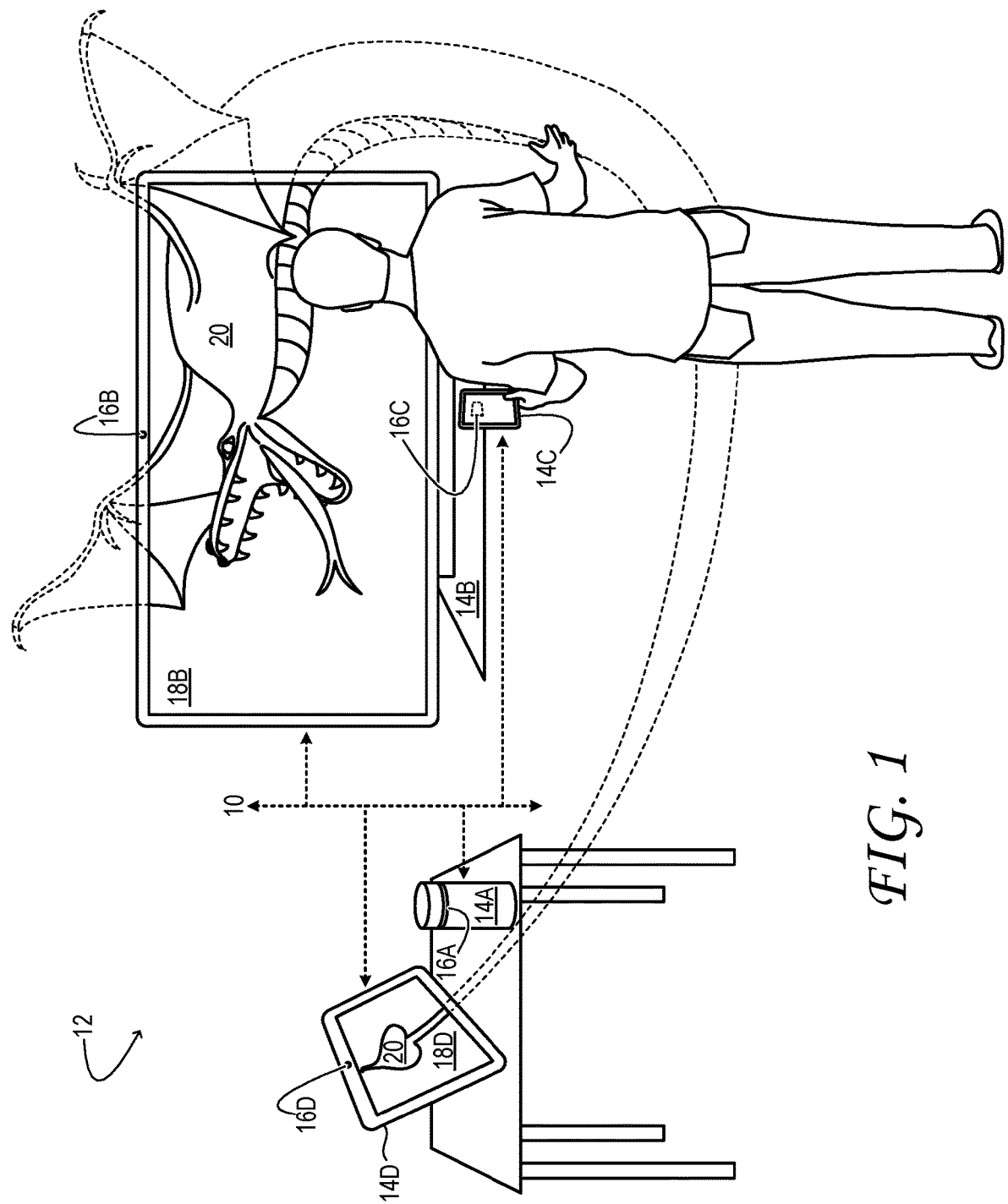
FIG. 1 shows aspects of an example network of electronic devices arranged in a shared physical environment.

This disclosure is presented by way of example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 is an illustration of an example network 10 of electronic devices arranged in a shared physical environment 12. Some of the electronic devices of the network include display devices, and some have optical imaging capability. Electronic device 14A is a local network hub equipped with an imaging system 16A in the form of a 360° panoramic camera. Other example networks may function with no hub per se, but may leverage the computer resources of any, some, or all of the included electronic devices to achieve coordinated operation.

To whatever extent is desired, network 10 may offer a coordinated data-sharing experience to the electronic devices within environment 12. The extent of the coordination may differ from one operating scenario to another. At one extreme, the network may exert active control over each electronic device in the environment. For instance, the network may control graphics rendering on the display screen 18 of each electronic device, so as to present a unified virtual reality 20 to users within the environment. In this example, each of the various display screens may provide a different, vantage-appropriate window into the virtual environment. At the opposite extreme, the network may exert little or no control over the electronic devices. Acting autonomously, any camera-enabled electronic device may image the display screen of another electronic device in the environment, and thereby examine the content that the other electronic device is presenting. In both scenarios, and at various intermediate levels of network control, it may be useful for a given electronic device to be able to recognize the display screens of other devices in the same environment, and to map the recognized display screens onto a coordinate system that spans the environment.

To further illustrate this feature, FIG. 1 shows an example electronic device 14B with a display screen 18B. Electronic device 14B may be configured to present any type of display content—text, graphics, video, or any combination thereof. In some examples, display screen 18B is a liquid-crystal display (LCD) screen, in which all of the display light passes through a plane polarizer of fixed orientation. In other examples, a display screen may be illuminated by one or more scanning laser beams, each conveying plane-polarized, monochromatic light. In other examples, a display screen may include an anti-reflective, anti-glare, or privacy coating that preferentially transmits a predetermined polarization component (i.e., a plane-polarized, circularly polarized, or elliptically polarized component, further specified by appropriate parameters). In still other examples, a display screen of any technology may be configured to spatially or temporally modulate the polarization state of alternating display frames, to provide stereo image content for a user wearing 3D glasses. In sum, light emission from a display screen is often polarized. Room light, by contrast, is typically unpolarized (comprising a broad distribution of polarization components). This difference may be exploited, as described herein, to identify portions of an imaged environment that correspond to a display screen 18 of an electronic device.

Figure 2:
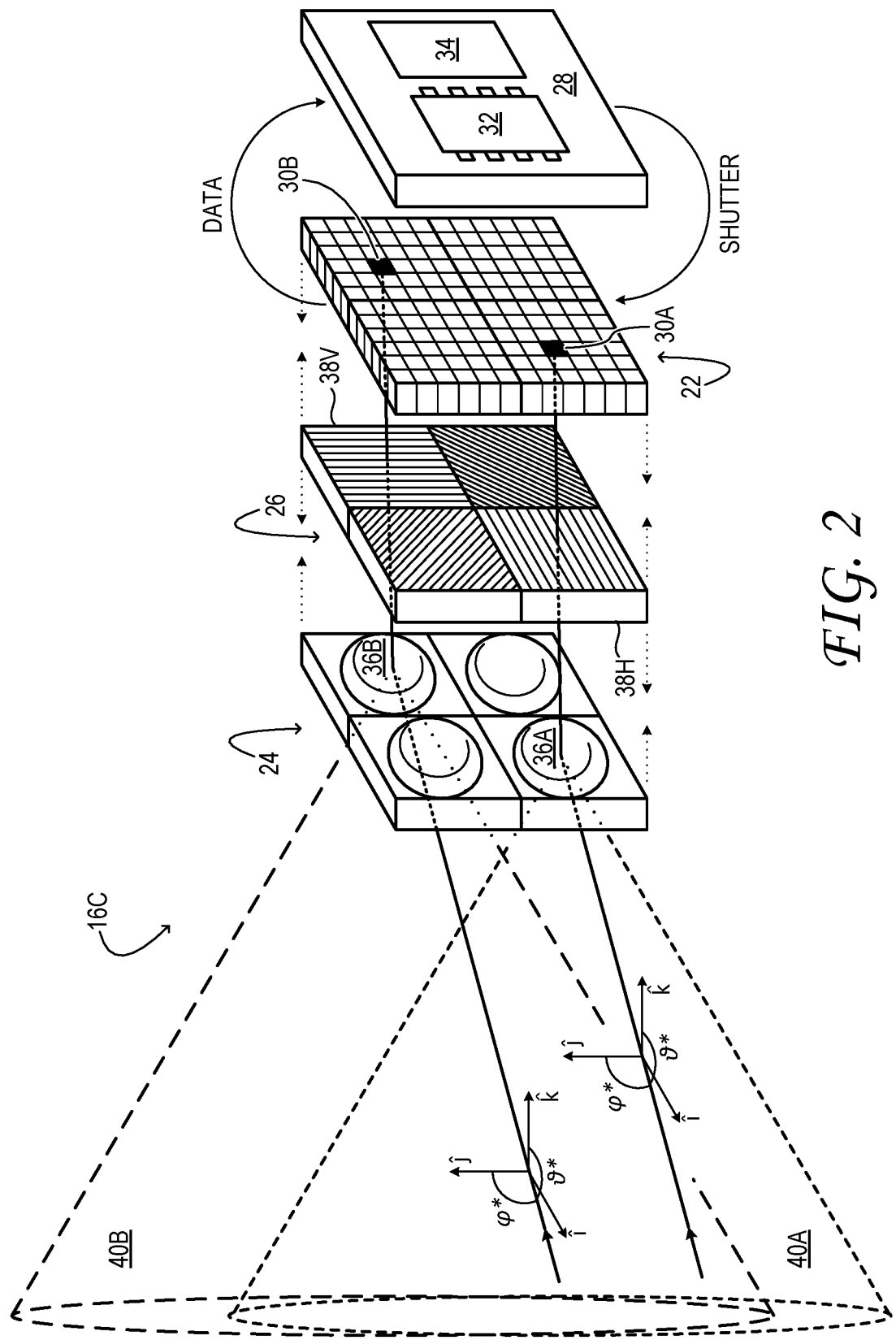
FIG. 2 shows aspects of an example electronic device with an imaging system employing a macrostructured polarizer.

FIG. 1 shows, accordingly, another example electronic device 14C, which is equipped with an imaging system. For ease of explanation, display and imaging functions are associated with separate electronic devices in the description herein. However, electronic devices configured both for display and imaging are also envisaged. FIG. 2 shows additional aspects of example electronic device 14C, in which the imaging system takes the form of a digital camera 16C.

Digital camera 16C includes an optical sensor array 22, an objective lens array 24, a macrostructured polarizer 26, and associated logic 28. The optical sensor array may take the form of a complementary metal-oxide-semiconductor (CMOS) array or a charge-coupled device (CCD) array, for example. The optical sensor array includes a plurality of sensor elements 30 arranged on a rectangular grid. In some examples, the flux of light received by each sensor element is converted to a proportional charge during a controlled integration interval (in which the electronic shutter of the optical sensor array remains open). In color-imaging examples, the digital camera may include a color-filter array (CFA, not shown in the drawings), positioned optically upstream of the optical sensor array. In some examples, a CFA may be positioned immediately forward of the optical sensor array. Individual color-filter elements of the CFA may be arranged in geometric registry with the sensor elements of the optical sensor array, such that adjacent groupings of sensor elements (which receive light through red-, green-, and blue-transmissive filter elements, for example) sense the color as well as the light intensity at the imaged locus of the subject. Logic 28 is configured to interrogate the charge accumulated on each sensor element and thereby acquire a digital image based on the integrated photon flux (i.e., brightness or light-intensity value) associated with each sensor element.

Generally speaking, each digital image may include a set of pixel elements $\{(X, Y)_i\}$. In color-imaging examples, each pixel element may be associated with corresponding digital color values $R_i$, $G_i$, and $B_i$, which define the relative intensity of the light received at that element in each of three different color channels. In some examples, any, some, or all of the pixel elements may also be associated with a corresponding object value $O_i$, which defines the type of object that pixel is associated with.

Logic 28 may include a processor 32 and associated computer memory 34. The computer memory may be configured to store the acquired digital image or any portion thereof. The computer memory may also hold processor-executable instructions that enable the processor to execute any process described herein. In some examples, the processor may comprise a system-on-a-chip (SoC), in which at least some of the executed processes are hardware-encoded.

Objective lens array 24 is positioned optically upstream of optical sensor array 22. The objective lens array includes a plurality of lens elements 36. Each lens element is configured to collect light within its field of view and to direct (e.g., focus and/or image) the collected light onto a corresponding area of the optical sensor array. In FIG. 2, light from the field of view of lens element 36A is directed over to an area that includes first sensor element 30A; light from the overlapping field of view of lens element 36B is directed to an area that includes second sensor element 30B. In this configuration, light received at any given angle within the overlapping fields of view may be directed onto nonadjacent or widely separated sensor elements. As used herein, the term 'angle' specifies direction in three-dimensional space. An angle may comprise an elevation angle φ, an azimuth angle θ, or a quantity representing both elevation and azimuth angles as components. In the illustrated example, light received at the angle (θ*, φ*) is directed by lens element 36A onto first sensor element 30A, and by lens element 36B and onto second sensor element 30B. In some examples, there may be three or more sensor elements onto which light received at a given angle is directed by corresponding lens elements of the objective lens array.

In some examples, lens elements 36 of objective lens array 24 may be microlens elements. Each microlens element may collect and focus light over a relatively narrow field of view. In this variant, the objective lens array may be configured such that large numbers of microlens elements cooperate to form images on corresponding areas of sensor array 22.

Continuing in FIG. 2, macrostructured polarizer 26 is arranged between optical sensor array 22 and objective lens array 24. The macrostructured polarizer includes a plurality of differently configured polarizer portions 38, each polarizer portion arranged between the objective lens array and a different area of the optical sensor array, and providing unequal relative attenuation of nonparallel polarization components of incident light. In some examples, the relative attenuation of each polarizer portion to nonparallel polarization components is a function of the orientation of that polarizer portion. For instance, polarizer portion 38H may include a parallel series of fine metal wires running horizontally (parallel to $\hat{i}$). Polarizer portion 38V may include a parallel series of fine metal wires running vertically (parallel to $\hat{j}$). The polarization component of normally incident light in which the electric-field vector oscillates parallel to $\hat{i}$ may be 95% attenuated by polarizer portion 38H but less than 5% attenuated by polarizer portion 38V. In contrast, the nonparallel polarization component in which the electric field vector oscillates parallel to $\hat{j}$ may be less than 5% attenuated by polarizer portion 38H but 95% attenuated by polarizer portion 38V. An analogous orientation effect would be observed for polarizer portions employing Fresnel reflection or birefringence to effect polarization filtering.

In FIG. 2 each polarizer portion 38 of macrostructured polarizer 26 covers a different image-receiving area of optical sensor array 22. As noted above, the images received in the different areas may correspond to overlapping fields of view, which share a broad range of angles $\{(\theta, \omega)\}$. However, the images pass through differently configured polarizer portions 38, which may unequally attenuate light received at the same angle (θ, ω), depending on the initial polarization state of the light. The resulting, potentially unequal intensities of the polarization-filtered light are then recorded at corresponding sensor elements of the optical sensor array—i.e., sensor elements that receive light from the same locus of the imaged environment. In the illustrated example, where polarizer portion 38H filters the light from angle (θ*, φ*) en route to sensor element 30A, and polarizer portion 38V filters the light from the same angle en route to corresponding sensor element 30B, the effect of unequal relative attenuance, if any, is recorded as a light-intensity difference at sensor element 30A relative to sensor element 30B.

In some scenarios, the light received at (θ*, φ*) will be room light emitted by a lamp, by the sun, or reflected from a surface which is not a display screen. Such light may include a uniform distribution of polarization components. As a result, the intensities recorded at sensor elements 30A and 30B will be the same. However, if the light received at (θ*, φ*) is polarized light from a display screen, then the relative intensities recorded at sensor elements 30A and 30B will differ. Accordingly, the intensity difference from polarization-filtered sensor elements receiving light from the same angle can be used as a basis for detection of a display screen of an electronic device. To that end, logic 28 may be configured to compare the intensity of light directed onto any first sensor element relative to light directed onto a corresponding second sensor element, which receives light from the same angle.

FIG. 2 shows only two sensor elements 30A and 30B that receive, through corresponding polarizer portions 38H and 38V, light from the same angle (θ*, φ*). By comparing the light intensity at these sensor elements, logic 28 would be able to detect light of any plane polarization, except for the ambiguous case in which the polarization plane happens to bisect the nonparallel polarization components for which polarizer portions 38H and 38V provide unequal relative attenuance. In other examples, however, there may be three or more sensor elements onto which light received at a given angle is directed by objective lens array 24, through three or more differently configured polarizer portions 38. In such examples, each polarizer portion may provide a different (i.e., nonredundant) relative attenuation of nonparallel polarization components of light received at any given angle. In examples in which three or more differently oriented plane-polarizer portions are provided, plane-polarized LCD emission would be detectable at any orientation of the display screen relative to the imaging system. Alternatively, or in addition, a third or subsequent polarizer portion may be configured to discriminate a nonplanar polarization component—e.g., an elliptically or circularly polarized component—enabling detection of display light transmitted through an anti-glare coating.

In the examples above, the imaging system is embodied as a single digital camera 16C having a specially configured objective lens array 24 and macrostructured polarizer 26, both associated with the same optical sensor array 22. As examples of multifurcated objective-lens and polarization-filter systems fixed in position relative to each other, these components enable a single sensor array to simultaneously acquire corresponding digital images with different polarization filtering. In other examples, an imaging system may include a plurality of optical sensor arrays; an objective-lens system comprised of plural, discrete lenses may be used to direct overlapping fields of view onto each of the sensor arrays, through discrete, differently configured polarizers.

Figure 3:
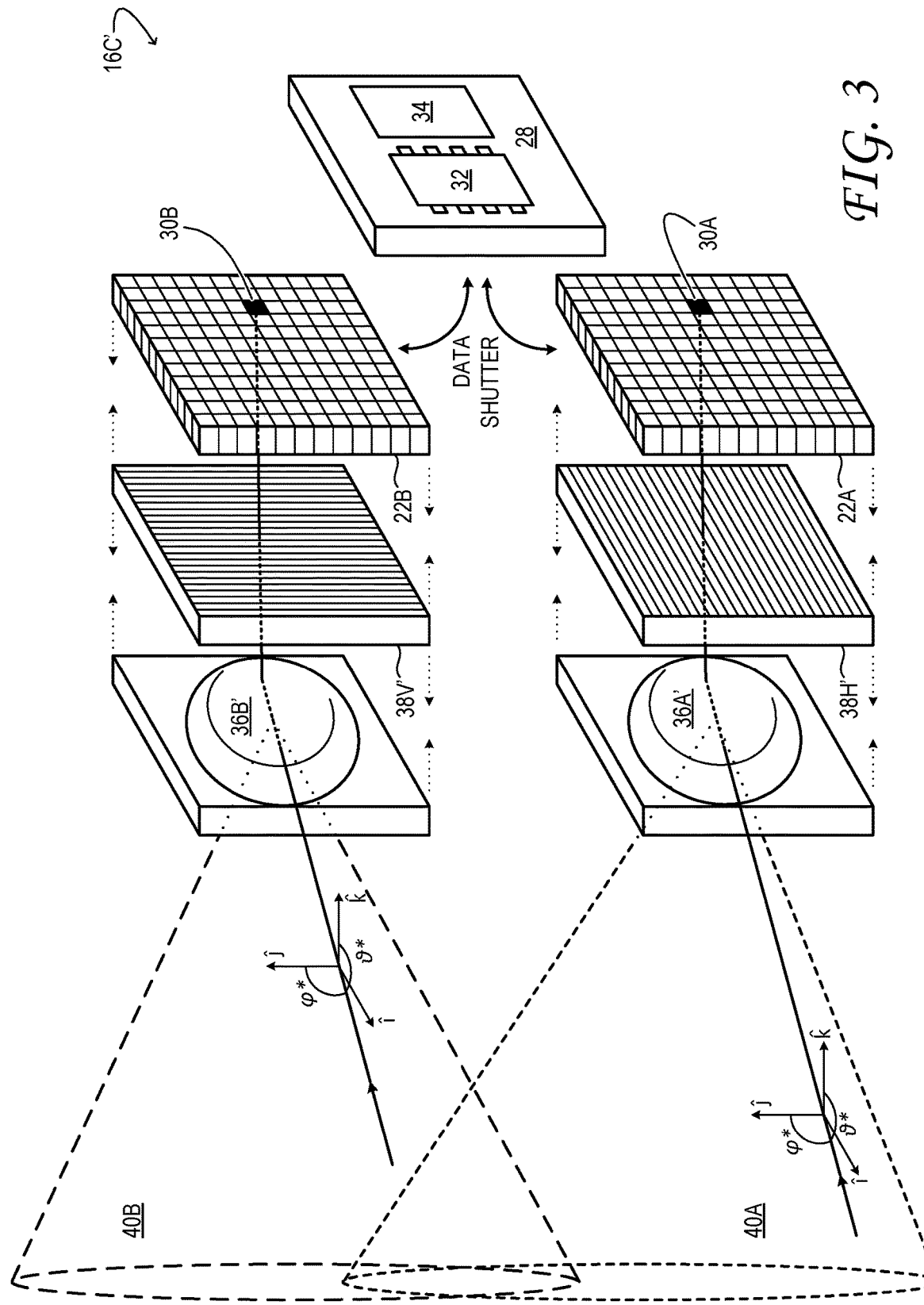
FIG. 3 shows aspects of an example electronic device with an imaging system employing a system of polarizers.

FIG. 3 shows aspects of another imaging system 16C', configured in this manner. Imaging system 16C' includes first and second optical sensor arrays 22A and 22B, each including a plurality of sensor elements 30, first and second objective lenses 36A' and 36B', first and second polarizers 38H' and 38V', and associated logic 28. The first objective lens is positioned optically upstream of the first optical sensor array and configured to direct light from first field of view 40A onto the first optical sensor array. The second objective lens is positioned optically upstream of the second optical sensor array and configured to direct light from the overlapping second field of view 40B onto the second optical sensor array.

First polarizer 38H' is positioned optically upstream of first optical sensor array 22A, and second polarizer 38V' is positioned optically upstream of second optical sensor array 22B. Accordingly, the first polarizer is positioned to filter light from first field of view 40A en route to the first optical sensor array, and the second polarizer is positioned to filter light from the overlapping second field of view 40B en route to the second optical filter array. In the illustrated example, each polarizer lies between its associated sensor array and objective lens. In other examples, the positions of the polarizers and objective lenses may be exchanged. Each polarizer 38' of imaging system 16C' may comprise a single polarizer portion, akin to a conventional polarizing filter used in photography. The first and second polarizers are oriented or otherwise configured to provide unequal relative attenuance of nonparallel polarization components of light of the overlapping first and second fields of view.

Logic 28 may be configured to interrogate sensor elements 30 of each optical sensor array 22 so as to acquire a series of digital images—viz., one image from each sensor array. In some examples, the operation of the electronic shutters of each optical sensor array may be synchronized—assuming that the various optical sensor arrays provide substantially equivalent quantum efficiencies at corresponding sensor elements, and that the overall collection efficiencies (aperture sizes, unwanted losses due to reflection, etc.) are similar for all the arrays. More generally, the integration periods and gain parameters for each optical sensor array may be adjusted to compensate for any nonideality, such that the baseline response of corresponding sensor elements is as near to equivalent as practicable. The logic may be further configured, as described hereinafter, to compare the intensity of the light directed onto sensor elements of the first optical sensor array relative to the light directed onto corresponding sensor elements of the second optical sensor array, in the overlapping first and second fields of view.

In some examples, imaging system 16C' may include three or more optical sensor arrays 22 onto which three or more overlapping fields of view 40 are directed. Each of the optical sensor arrays may be associated with a differently configured polarizer 38' providing a different (i.e., nonredundant) relative attenuation of nonparallel polarization components of the light of the overlapping fields of view. Such components may include plane-polarized, circularly polarized, and/or elliptically polarized components. Accordingly, logic 28 may be configured to compare the intensity of the light directed onto corresponding sensor elements of each of the three or more optical sensor arrays.

Figure 4:
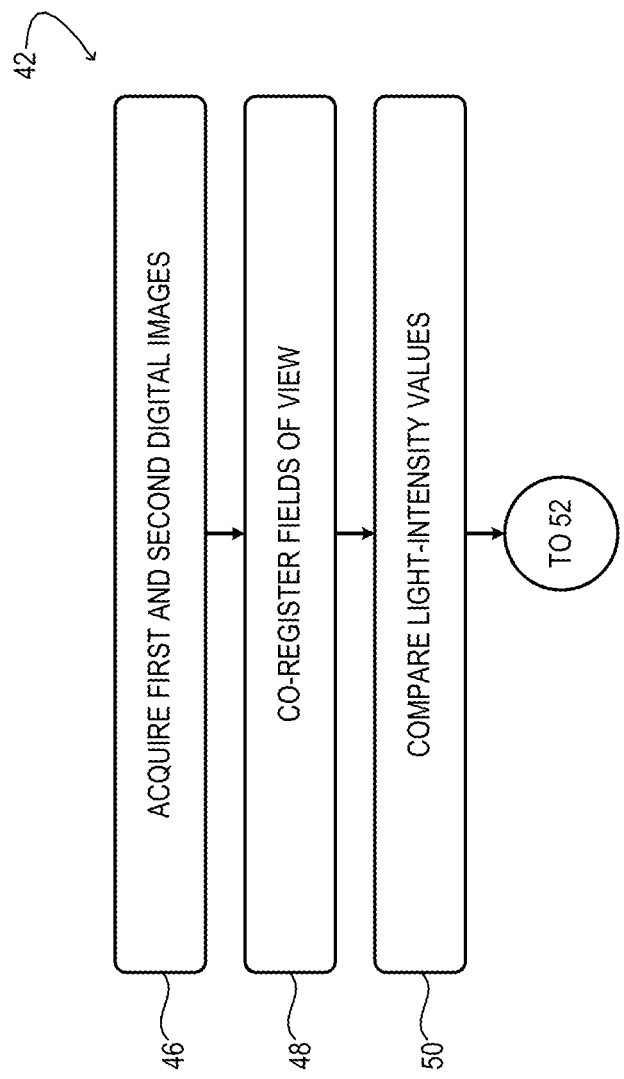
FIG. 4 illustrates selected aspects of a method to detect and identify a display screen in a field of view of an imaging system.

FIG. 4 illustrates selected aspects 42 of a method to detect and identify a display screen in a field of view of an imaging system. Aspects 42 may be enacted in logic 28 of the imaging system, for example.

At 44 of method 42, first and second digital images are acquired by interrogating the sensor elements of one or more optical sensor arrays of the imaging system. More particularly, sensor elements receiving an image from a first field of view are interrogated so as to acquire a first digital image, and sensor elements receiving an image from an overlapping second field of view are interrogated so as to acquire a second digital image.

FIG. 5 provides an illustrative comparison of an example first digital image 45A (corresponding to first field of view 40A of digital camera 16C) and second digital image 45B (corresponding to second field of view 40B). Imaged display screen 18B appears dark in the first digital image because the primary polarization component of this display screen is strongly attenuated by first polarizer 38H' or first polarizer portion 38H. However, display screen 18D appears dark in the second digital image because the primary polarization component of that display screen is attenuated by second polarizer 38V' or second polarizer portion 38V.

Returning now to FIG. 4, at 46 the first and second digital images are processed in order to co-register the first field of view represented in the first digital image to the overlapping second field of view represented in the second digital image. In some examples, feature recognition and/or other aspects of computer vision may be used to achieve the co-registration. In some examples, image registration may be approximated by known intrinsics and positional extrinsics of the camera systems. In examples in which the imaging system is configured as a depth camera, corresponding portions of the first and second digital images may be computed geometrically. In some examples, this process may include identification of corresponding pixel elements of the first and second digital images that are associated with corresponding sensor elements of the one or more optical sensor arrays—viz., sensor elements 30A and 30B in the drawings herein, which receive light from the same angle. In effect, the co-registration aspect identifies corresponding pixel elements of the first and second digital images, which, in turn, identify the corresponding sensor elements of the one or more optical sensor arrays.

At 50 the light-intensity values of corresponding pixel elements of the first and second digital images are compared, providing, equivalently, a comparison of the intensity of the light directed onto each sensor element relative to light received at the same angle and directed onto a corresponding sensor element with different polarization filtering. Stated another way, the intensity of the light from overlapping, but differently filtered first and second fields of view is compared pixel by corresponding pixel, allowing for any appropriate offset due to parallax. In examples in which the polarization filter system includes three or more differently configured polarizer portions, the light-intensity values from three or more corresponding sensor elements may be compared.

Figure 6:
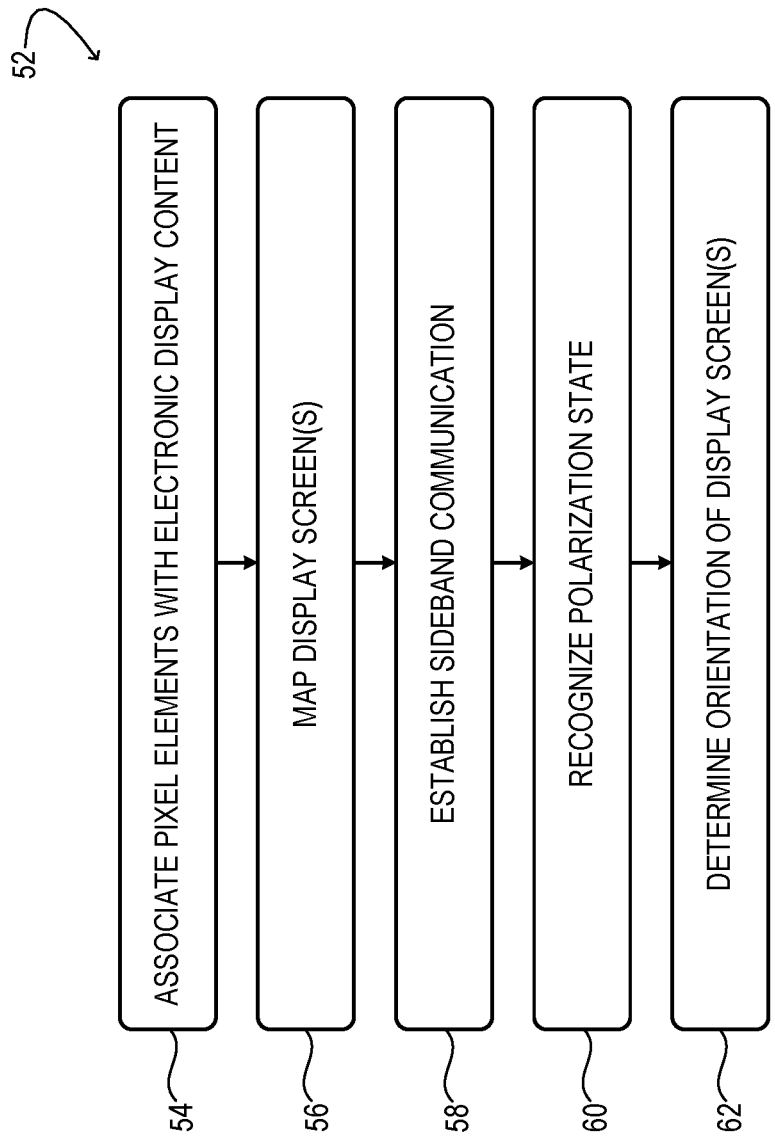
FIG. 6 illustrates additional selected aspects of a method to detect and identify a display screen in a field of view of an imaging system.

FIG. 6 illustrates additional aspects 52 of a method to detect and identify a display screen in a field of view of an imaging system. These aspects also may be enacted in logic 28 of the imaging system, for example.

At 54 one or more pixel elements of the first digital image are associated with electronic display content based on a difference in the light-intensity values of those pixel elements relative to corresponding pixel elements of the second digital image. In some examples, pixel elements may be associated with display content when the difference in light-intensity values exceeds a predetermined threshold— e.g., 5%, 10%, 20%, or any other suitable threshold. In some examples, pixel elements may be associated with display content via an indexing or tagging operation, in which the object value $O_i$ of the one or more pixel elements $(X, Y)_i$ is loaded with a bit value corresponding to electronic display content. In some scenarios, a difference in light intensity may be used as a trigger to further analyze the pixel and/or nearby pixels with a previously-trained, machine-learning classifier configured to precisely locate display screens. Such a two-stage approach may increase the efficiency when compared to analyzing an entire image via the previously-trained, machine-learning classifier.

At 56, provided that a threshold number of pixel elements have been associated with electronic display content, one or more electronic display screens may be mapped onto a frame of reference of the imaging system, based on the locations of the pixel elements associated with electronic display content. The mapping operation may include defining one or more quadrilateral boundaries of tagged pixel elements and returning the corner positions of the quadrilateral boundaries (e.g., via pixel-by-pixel light-intensity analysis and/or complimentary image analysis). In some examples, the object value $O_i$ of one or more pixel elements may be loaded with additional bit values to specify a particular display screen from among a plurality of display screens mapped. The mapping of detected display screens may enable electronic device 14C or network 10 to estimate the locations and physical dimensions of the detected display screens, even in cases in which a display screen is observed obliquely. In some examples—i.e., when electronic device 14C is able to be moved about environment 12—mapping at 56 may be repeated for different positions or orientations of the imaging system relative to the display screens.

At 58 a sideband communication is established between electronic device 14C (with an associated imaging system) and electronic device 14B (with a mapped display screen). The sideband communication may enable electronic device 14B to identify itself visually. In some examples, electronic device 14B may be prompted to modulate the display emission from display screen 18B in a manner that can be recognized by other electronic devices of network 10. For example, electronic device 14B may temporally modulate the light intensity or color of the emission from the display screen, to subtly broadcast its identity to suitably configured imaging systems in the network. In some examples, the modulation may be significant enough for an imaging system to detect but too subtle for the user to detect. This optional feature is useful in scenarios in which a plurality of display screens are detected in the overlapping fields of view, and it is desirable to associate each display screen with the electronic device controlling it.

At 60 the polarization state of emission from one or more of the mapped display screens optionally may be recognized. Recognition of the polarization state may include characterization of the polarization state as plane-polarized, circularly polarized, or elliptically polarized state. In addition, appropriate quantitative parameters that further characterize the polarization state may be determined. Such parameters may include the orientation of a polarization plane, if any, and/or real and imaginary components of the primary component. In some examples, the object value $O_i$ of one or more pixel elements may be loaded with additional bit values to specify quantitative parameters.

At 62 the orientations of the one or more display screens mapped into the coordinate system optionally may be determined based on the polarization states recognized within the mapped regions. For example, it may be known or assumed that a given display screen 18 in environment 12 emits plane-polarized light in which the polarization plane is aligned with the rows of the display screen. If the imaging system detects polarized emission from that display, with the polarization plane at an angle β, then it may be determined that the offset angle between the rows of the display screen versus the rows of the one or more sensor arrays of the imaging system is also β.

The examples above share a common feature, in that some of the spatial resolution of the imaging system (as distributed among one or more optical sensor arrays) is sacrificed in order to resolve polarization in the acquired digital images. However, each optical sensor array of the imaging system continues to operate at its full temporal bandwidth. This feature is useful in scenarios in which the electronic devices of the environment are in motion relative to each other. Nevertheless, the complementary approach is also contemplated. In other words, an imaging system may retain its full spatial resolution—and the advantages thereof—at the expense of some temporal bandwidth.

Figure 7:
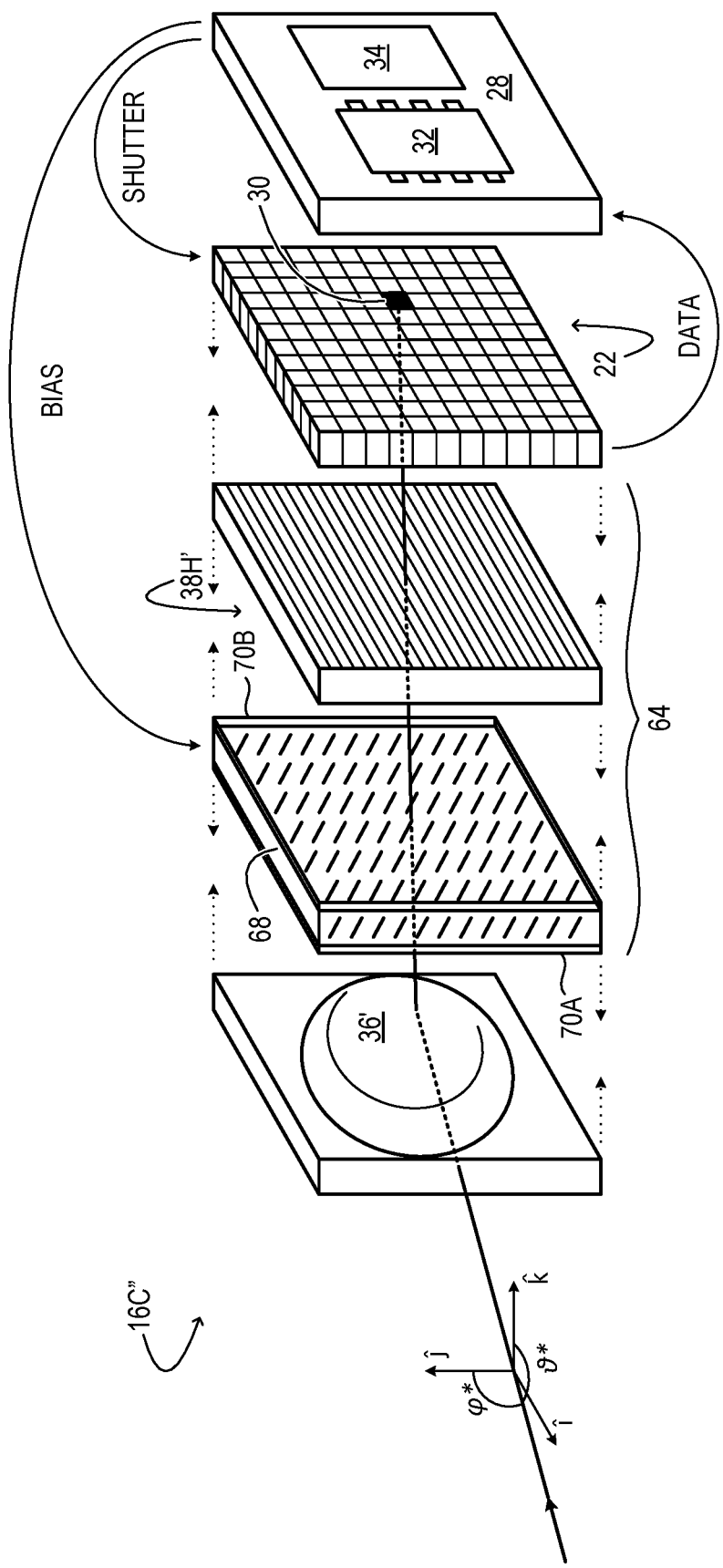
FIG. 7 shows aspects of an example electronic device with an imaging system employing an active polarization filter.

FIG. 7 shows aspects of another example imaging system 16C". Imaging system 16C" includes an optical sensor array 22 with a plurality of sensor elements 30, an objective lens 36', an active polarization filter 64, and associated logic 28.

Objective lens 36' is positioned optically upstream of optical sensor array 22. Light from the field of view of the objective lens is directed onto the plurality of sensor elements 30. Active polarization filter 64 is positioned optically upstream of the optical sensor array, so as to filter the light en route to the optical sensor array. In FIG. 7 the active polarization filter is arranged between the optical sensor array and objective lens. In other examples, the positions of the active polarization filter and the objective lens array may be exchanged. The active polarization filter is switchable electronically between first and second operational states, as described below.

Active polarization filter 64 includes a plane polarizer 38H' and a liquid-crystal (LC) layer 68 capable of reorientation in an applied electric field. In some examples, the LC layer may also be capable of reorientation in an applied magnetic field. In the illustrated example, the LC layer is arranged between substantially transparent electrodes 70A and 70B. Each electrode may comprise a degenerately doped semiconductor film (e.g., indium tin oxide) arranged on a glass or transparent polymer substrate. Other types of film coatings imparting conductance are also envisaged. The film coatings may be modified (differently, in some examples) in order to influence the orientation of LC molecules at each electrode interface.

Logic 28 is configured to apply controlled electrical bias between electrodes 70A and 70B, to thereby exert an applied electric field across LC layer 68 under predetermined conditions. In the absence of applied bias, the LC molecules may adopt a resting alignment determined by the resting electric field at each electrode interface. This condition is referred to as the 'first operational state' of the active polarization filter. Under conditions of applied bias, the applied electric field may overwhelm the influence of the resting electric field and may reorient the LC molecules to a modified alignment. That condition is referred to as the 'second operational state' of the active polarization filter.

When light passes through an LC layer, the polarization components of the light may experience rotation and/or optical activity (e.g., retardance). Moreover, the direction and amount of the rotation and/or retardance may depend on the state of alignment of the LC molecules. Accordingly, plane-polarized components of light passing through LC layer 68 may experience a different rotation in the first versus the second operational state of active polarization filter 64. Then, when the polarization components rotated by different amounts encounter plane polarizer 38H', such components may experience different levels of attenuation, as described hereinabove. In this manner, active polarization filter 64 may provide unequal relative attenuation, in the first versus the second operational state, of nonparallel polarization components of light transmitted therethrough.

In one particular example, LC layer 68 may include nematic, axial LC molecules that support a 'twisted' resting alignment in the first operational state of active polarization filter 64. For instance, the LC molecules at the interface with electrode 70A may align horizontally due to the surface modification of that electrode, and the LC molecules at the interface with electrode 70B may align vertically. Between the two electrodes, the LC molecules may assemble into long chains that adopt a helical, twisted arrangement. This resting alignment of the LC layer may result in a 90° rotation of any plane-polarized component passing through the LC layer. However, in the second operational state, when bias is applied between the electrodes, the twisted arrangement may be disrupted, as the LC molecules align parallel to the applied electric field lines. In this modified alignment, the LC layer does not rotate the polarization plane of the incident light.

Accordingly, in the first operational state of active polarization filter 64, the component of incident light in which the electric-field vector oscillates parallel to $\hat{i}$ is rotated by 90° in LC layer 68, so that it emerges from the LC layer parallel to $\hat{j}$. This light may be less than 5% attenuated by plane polarizer 38H'. In the second operational state, this same component encounters plane polarizer 38H' in its initial, unrotated polarization state, and may be 95% or more attenuated. In contrast, the nonparallel polarization component in which the electric field vector oscillates parallel to $\hat{j}$ is rotated by 90° in the first operational state, such that it emerges the LC layer parallel to $\hat{i}$. Such light may be 95% or more attenuated by plane polarizer 38H'. In the second operational state, this component encounters plane polarizer 38H' in its initial, unrotated polarization state, and may less than 5% attenuated.

In the above example, unequal relative attenuation of nonparallel polarization components in the first versus the second operational state is described with reference to a twisted nematic (TN) LC layer, as an example. A similar effect would be observed for other types of LC layers—e.g., vertical alignment (VA) and in-plane switching (IPS) layers.

As described in further detail below, logic 28 of imaging system 16C" may be configured to switch the active polarization filter from the first polarization state to the second polarization state, to acquire a first digital image by reading light-intensity values from optical sensor array 22 that were integrated with active polarization filter 64 in the first operational state, and to acquire a second digital image by reading light-intensity values from the optical sensor array that were integrated with the active polarization filter in the second operational state. Then, by comparing the light-intensity values of corresponding pixel elements of the first and second digital images, loci of polarized irradiance can be distinguished in the first and second digital images. As in the above examples, such loci may be associated with a display screen of an electronic device.

In some examples, the electrical bias applied between electrodes 70A and 70B is fully 'off' in the first operational state of active polarization filter 64, and fully 'on' in the second operational state. With only two operational states, imaging system 16C" may be configured to detect light of any plane-polarization state, except for the ambiguous case in which the polarization plane bisects the nonparallel polarization components for which the active polarization filter is configured to provide unequal relative attenuation. This functionality is akin to that of imaging system 16C in variants having only two polarizer portions, and imaging system 16C' in variants having only two sensor arrays.

In other examples, however, active polarization filter 64 may be switchable among three or more operational states, in which a different (i.e., nonredundant) relative attenuation of nonparallel polarization components is provided. In some LC layer configurations, including the TN and VA variants presented above, this result can be achieved by application of intermediate levels of bias between electrodes 70A and 70B, which results in intermediate states of LC alignment. In some examples, the angle of rotation provided by LC layer 68 may be varied continuously from 0 to 90° by continuous variation of the applied bias.

Figure 8:
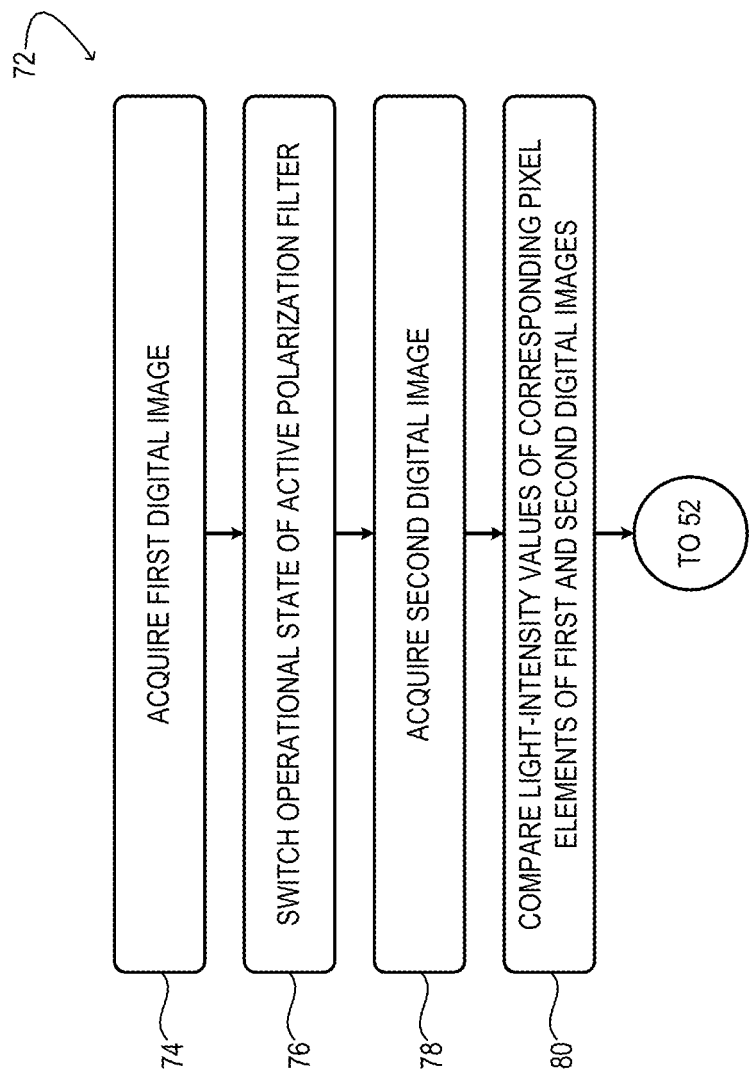
FIG. 8 illustrates selected aspects of another method to detect and identify a display screen in a field of view of an imaging system.

FIG. 8 illustrates selected aspects 72 of a method to detect and identify an electronic display screen in a field of view of an imaging system. This method may be enacted by logic 28 of imaging system 16C", for example, in which an active polarization filter is associated with a plurality of sensor elements of an optical sensor array.

At 74 a first digital image is acquired by reading light-intensity values from the optical sensor array that were integrated with the active polarization filter in a first operational state.

At 76 the active polarization filter is switched from the first operational state to a second operational state, in which the active polarization filter provides unequal relative attenuance, relative to the first operational state, of nonparallel polarization components.

At 78 a second digital image is acquired by reading light-intensity values from the optical sensor array that were integrated with the active polarization filter in the second operational state. In some examples, the gain, integration period, and other operational parameters of the optical sensor array may be kept the same in the second operational state of the active polarization filter as in the first operational state. In other examples, such parameters may be adjusted in order to compensate for any nonideal attenuance property of the active polarization filter. In some examples, the switching of the active polarization filter at 76 may be synchronized to the electronic shutter of the optical sensor array.

At 80 light-intensity values of corresponding pixel elements of the first and second digital images are compared. This action compares, in effect, the light-intensity response of the plurality of sensor elements in the first operational state of the active polarization filter to the light-intensity response of the plurality of sensor elements in the second operational state of the active polarization filter. In examples in which the active polarization filter is operable in three or more operational states, the light-intensity response in each of the three or more operational states may be compared.

After this stage, the method of display-screen detection may continue as described above in the context of FIG. 6.

No aspect of the foregoing drawings or description should be construed in a limiting sense, for numerous variations, combinations, extensions, and omissions are also envisaged. For example, although the imaging systems illustrated above achieve polarization filtering using fixed polarizer portions on the one hand, or an electronically switched polarization filter on the other, a combined approach is also envisaged. In particular, an imaging system may include both fixed and electronically switched polarization filters, with coordinated processing of the acquired digital images to resolve the polarization state.

Furthermore, the detailed configuration of the fixed and electronically switched polarization filters used in the imaging systems is in no sense limited by the examples given above. In some alternative implementations, the optical stack-up may include one or more waveplates and/or color filters. Waveplates may be used to retard polarization components unequally to create areas of the system's field of view which are sensitive to circular or elliptical polarization. A color filter arranged between a waveplate and the optical sensor array may allow for detection of color shifts produced by wavelength-dependent polarization effects of the waveplate or polarizer. In this case, the relative 'light-intensity' values that form the basis for resolution of nonparallel polarization components may be normalized for attenuation by the color filter, and in some instances for the spectral characteristics of the sensor. Alternatively, a relative difference in color values may be used to resolve the underlying polarization.

The drawings herein schematically show a non-limiting embodiment of a logic 28 in the form of a computer system that can enact one or more of the methods and processes described above. Logic 28 includes a processor 32 and associated computer memory 34.

Processor 32 includes one or more physical devices configured to execute instructions. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Processor 32 may include one or more microprocessors configured to execute software instructions. Additionally or alternatively, the processor may include one or more hardware or firmware processors configured to execute hardware or firmware instructions. Microprocessors of the computer system may be single-core or multi-core, and the instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration.

Computer memory 34 includes one or more physical devices configured to hold instructions executable by the processor to implement the methods and processes described herein. When such methods and processes are implemented, the state of computer memory 34 may be transformed—e.g., to hold different data.

Computer memory 34 may include removable and/or built-in devices. Computer memory 34 may include optical memory (e.g., CD, DVD, HD-DVD, Blu-Ray Disc, etc.), semiconductor memory (e.g., RAM, ROM, EPROM, EEPROM, etc.), and/or magnetic memory (e.g., hard-disk drive, tape drive, MRAM, etc.), among others. Computer memory 34 may include volatile, nonvolatile, dynamic, static, read/write, read-only, random-access, sequential-access, location-addressable, file-addressable, and/or content-addressable devices.

It will be appreciated that computer memory 34 includes one or more physical devices. However, aspects of the instructions described herein alternatively may be propagated by a communication medium (e.g., an electromagnetic signal, an optical signal, etc.) that is not held by a physical device for a finite duration.

Aspects of processor 32 and computer memory 34 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

One aspect of this disclosure is directed to an imaging system comprising an optical sensor array including a plurality of sensor elements; an objective lens configured to direct light from a field of view onto the plurality of sensor elements; an active polarization filter; and associated logic.

Switchable electronically between first and second operational states, the active polarization filter positioned to filter the light en route to the optical sensor array, the active polarization filter providing unequal relative attenuance, in the first versus the second operational state, of nonparallel polarization components of the light. The logic is configured to switch the active polarization filter from the first operational state to the second operational state, and to compare a light-intensity response of the plurality of sensor elements in the first operational state of the active polarization filter to the light-intensity response of the plurality of sensor elements in the second operational state of the active polarization filter.

In some implementations, the active polarization filter includes a liquid-crystal layer subject to reorientation in an applied field controlled by the logic. In some implementations, the liquid-crystal layer admits of a twisted nematic state. In some implementations, the liquid-crystal layer is arranged on a substantially transparent conductor. In some implementations, the first and second operational states are among three or more operational states of the active polarization filter, and the liquid-crystal layer adopts a first alignment in the first operational state, a nonparallel second alignment in the second operational state, and, in the third operational state, a third alignment intermediate between the first and second alignments. In some implementations, the nonparallel polarization components include two or more plane-polarization components. In some implementations, the nonparallel polarization components are substantially orthogonal. In some implementations, the first and second operational states are among three or more operational states of the active polarization filter, the active polarization filter provides different relative attenuance of the nonparallel polarization components in each of the three or more operational states, and the logic is configured to compare the light-intensity response of the plurality of sensor elements in each of the three or more operational states. In some implementations, the logic is further configured to acquire a first digital image by reading light-intensity values from the optical sensor array that were integrated with the active polarization filter in the first operational state, to switch the active polarization filter from the first operational state to the second operational state, and to acquire a second digital image by reading light-intensity values from the optical sensor array that were integrated with the active polarization filter in the second operational state. In some implementations, switching the active polarization filter is synchronized to an electronic shutter of the optical sensor array.

Another aspect of this disclosure is directed to a method to detect a display screen in a field of view of the imaging system. Enacted in an imaging system with an active polarization filter associated with a plurality of sensor elements of an optical sensor array, the method comprises switching the active polarization filter from a first operational state to a second operational state, the active polarization filter providing unequal relative attenuance, in the first versus the second operational state, of nonparallel polarization components of light; and comparing a light-intensity response of the plurality of sensor elements in the first operational state of the active polarization filter to the light-intensity response of the plurality of sensor elements in the second operational state of the active polarization filter.

In some implementations, the method further comprises acquiring a first digital image by reading light-intensity values from the optical sensor array that were integrated with the active polarization filter in the first operational state, and acquiring a second digital image by reading light-intensity values from the optical sensor array that were integrated with the active polarization filter in the second operational state, wherein comparing the light-intensity response comprises comparing light-intensity values of corresponding pixel elements of the first and second digital images. In some implementations, the method further comprises associating a pixel element of the first digital image with electronic display content based on a difference in light-intensity value of that pixel element relative to a corresponding pixel element of the second digital image. In some implementations, the method further comprises mapping the electronic display screen onto a frame of reference of the imaging system based on the pixel element associated with the electronic display content. In some implementations, the mapping is repeated for different positions or orientations of the imaging system relative to the display screen. In some implementations, the method further comprises recognizing a polarization state of emission from the display screen, wherein the polarization state is plane-polarized, circularly polarized, or elliptically polarized. In some implementations, the method further comprises determining an orientation of the display screen based on the polarization state. In some implementations, the electronic display screen is a liquid-crystal display screen.

Another aspect of this disclosure is directed to a method to identify a display screen in a field of view of the imaging system. Enacted in an imaging system with an active polarization filter associated with a plurality of sensor elements of an optical sensor array, the method comprises acquiring a first digital image by reading light-intensity values from the optical sensor array that were integrated with the active polarization filter in a first operational state; switching the active polarization filter from the first operational state to a second operational state, the active polarization filter providing unequal relative attenuance, in the first versus the second operational state, of nonparallel polarization components of light; acquiring a second digital image by reading light-intensity values from the optical sensor array that were integrated with the active polarization filter in the second operational state; comparing light-intensity values of corresponding pixel elements of the first and second digital images; associating a pixel element of the first digital image to electronic display content based on a difference in the light-intensity value of that pixel element relative to a corresponding pixel element of the second digital image; and mapping the electronic display screen in a frame of reference of the imaging system based on the pixel element associated with the electronic display content.

In some implementations, the method further comprises establishing sideband communication from the imaging system to an electronic device controlling the display screen, including influencing light emission from the display screen.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An imaging system comprising:
    an optical sensor array including a plurality of sensor elements;
    an objective lens configured to direct light from a field of view onto the plurality of sensor elements;
    switchable electronically between first and second operational states, an active polarization filter positioned to filter the light en route to the optical sensor array, the active polarization filter providing unequal relative attenuation of nonparallel polarization components of the light in the first operational state versus the second operational state; and
    logic configured to switch the active polarization filter from the first operational state to the second operational state, and to compare a first light-intensity response of the plurality of sensor elements in the first operational state of the active polarization filter to a second light-intensity response of the plurality of sensor elements in the second operational state of the active polarization filter,
    wherein the logic is further configured to establish sideband communication from the imaging system to an electronic device controlling a display screen, including influencing light emission from the display screen.

2. The imaging system of claim 1 wherein the active polarization filter includes a liquid-crystal layer subject to reorientation in an applied field controlled by the logic.

3. The imaging system of claim 2 wherein the liquid-crystal layer admits of a twisted nematic state.

4. The imaging system of claim 2 wherein the liquid-crystal layer is arranged on a substantially transparent conductor.

5. The imaging system of claim 2 wherein the first and second operational states are among three or more operational states of the active polarization filter, wherein the liquid-crystal layer adopts a first alignment in the first operational state, a nonparallel second alignment in the second operational state, and, in the third operational state, a third alignment intermediate between the first and second alignments.

6. The imaging system of claim 1 wherein the nonparallel polarization components include two or more plane-polarization components.

7. The imaging system of claim 1 wherein the nonparallel polarization components are substantially orthogonal.

8. The imaging system of claim 1 wherein the first and second operational states are among three or more operational states of the active polarization filter, wherein the active polarization filter provides different relative attenuance of the nonparallel polarization components in each of the three or more operational states, and wherein the logic is configured to compare a light-intensity response of the plurality of sensor elements in each of the three or more operational states.

9. The imaging system of claim 1 wherein the logic is further configured to acquire a first digital image by reading first light-intensity values from the optical sensor array that were integrated with the active polarization filter in the first operational state, to switch the active polarization filter from the first operational state to the second operational state, and to acquire a second digital image by reading second light-intensity values from the optical sensor array that were integrated with the active polarization filter in the second operational state.

10. The imaging system of claim 1 wherein switching the active polarization filter is synchronized to an electronic shutter of the optical sensor array.

11. Enacted in an imaging system with an active polarization filter associated with a plurality of sensor elements of an optical sensor array, a method to detect a display screen in a field of view of the imaging system, the method comprising:
    switching the active polarization filter from a first operational state to a second operational state, the active polarization filter providing unequal relative attenuance, in the of nonparallel polarization components of light in the first operational state versus the second operational state;
    acquiring a first digital image by reading first light-intensity values from the optical sensor array that were integrated with the active polarization filter in the first operational state, and acquiring a second digital image by reading second light-intensity values from the optical sensor array that were integrated with the active polarization filter in the second operational state;
    comparing light-intensity values of corresponding pixel elements of the first and second digital images;
    associating a pixel element of the first digital image with electronic display content based on a difference in light-intensity value of the pixel element relative to a corresponding pixel element of the second digital image;
    mapping the display screen onto a frame of reference of the imaging system based on the pixel element associated with the electronic display content; and
    determining an orientation of the display screen based on a polarization state of emission from the display screen as indicated by the difference in the light-intensity value of the pixel element relative to the corresponding pixel element of the second digital image.

12. The method of claim 11 wherein the mapping is repeated for different positions or orientations of the imaging system relative to the display screen.

13. The method of claim 11 further comprising recognizing the polarization state of emission from the display screen, wherein the polarization state is plane-polarized, circularly polarized, or elliptically polarized.

14. The method of claim 11 wherein the display screen is a liquid-crystal display screen.

15. Enacted in an imaging system with an active polarization filter associated with a plurality of sensor elements of an optical sensor array, a method to identify a display screen in a field of view of the imaging system, the method comprising:
    acquiring a first digital image by reading first light-intensity values from the optical sensor array that were integrated with the active polarization filter in a first operational state;
    switching the active polarization filter from the first operational state to a second operational state, the active polarization filter providing unequal relative attenuance of nonparallel polarization components of light in the first operational state versus the second operational state;
    acquiring a second digital image by reading second light-intensity values from the optical sensor array that were integrated with the active polarization filter in the second operational state;
    comparing light-intensity values of corresponding pixel elements of the first and second digital images;

associating a pixel element of the first digital image to electronic display content based on a difference in the light-intensity value of the pixel element relative to a corresponding pixel element of the second digital image;

mapping the display screen in a frame of reference of the imaging system based on the pixel element associated with the electronic display content; and establishing sideband communication from the imaging system to an electronic device controlling the display screen, including influencing light emission from the display screen.

\* \* \* \* \*